United States Patent [19]

Taguchi

[11] Patent Number: 5,014,741
[45] Date of Patent: May 14, 1991

[54] OIL PASSAGE STRUCTURE IN TRANSMISSION CASING OF AN AUTOMATIC TRANSMISSION FOR AUTOMOTIVE VEHICLES

[75] Inventor: Hiromi Taguchi, Kanagawa, Japan

[73] Assignee: Nissan Motor Company, Limited, Yokohama, Japan

[21] Appl. No.: 381,069

[22] Filed: Jul. 18, 1989

[30] Foreign Application Priority Data

Jul. 18, 1988 [JP] Japan .................. 63-93949[U]

[51] Int. Cl.$^5$ ............................................. F01M 11/00
[52] U.S. Cl. ................................... 137/565; 184/6.12; 184/6.28
[58] Field of Search .............. 137/565; 184/6.28, 27.1, 184/6.12

[56] References Cited

U.S. PATENT DOCUMENTS 3,618,711 11/1971 Vollmer ........................ 184/6.28
3,618,712 11/1971 Casey ........................... 184/6.28

FOREIGN PATENT DOCUMENTS 60-7360 1/1985 Japan.
23838 1/1987 Japan ............................ 184/6.28

Primary Examiner—A. Michael Chambers
Attorney, Agent, or Firm—Foley & Lardner

[57] ABSTRACT

An oil passage structure in a transmission casing of an automotive automatic transmission, comprises, at an outer peripheral abutting surface between the transmission casing and the oil pump cover, an opening defined in the transmission casing which is exposed to the abutting surface of the transmission casing and is communicated with the inlet port of the valve assembly provided in the bottom section of the transmission through a single vertical oil channel formed in the transmission casing by machining to provide the shortest distance between the inlet port of the valve assembly and the opening. The oil passage structure also comprises an oil groove which is integrally formed on the abutting surface by die-casting and includes a point connecting the outlet port of the oil pump through an oil passage defined in the oil pump cover, to intercommunicate the opening and the connecting point.

5 Claims, 3 Drawing Sheets

OIL PASSAGE STRUCTURE IN TRANSMISSION CASING OF AN AUTOMATIC TRANSMISSION FOR AUTOMOTIVE VEHICLES

BACKGROUND OF THE INVENTION

1. Field of The Invention

The present invention relates to an oil passage structure in the transmission casing of an automotive automatic transmission in which oil passages intercommunicating the oil pump, provided for supplying operating oil, a valve assembly having a control valve for controlling flow paths of the operating oil from the oil pump and an oil pressure regulator valve for regulating the oil pressure from the oil pump are integrally formed.

2. Description of The Prior Art

As is generally known, the conventional automotive automatic transmission includes an oil pump assembly which is traditionally disposed in the vicinity of the abutting portion between the transmission casing accommodating the gear train and the torque converter housing containing the torque converter assembly therein.

FIG. 1 is a partial sectional view illustrating a conventional automatic transmission having an oil pump assembly including an oil pump housing 20, an oil pump cover 21, an inner gear (drive gear) 17, an outer gear (driven gear) 18, and a stationary crescent 19 integrally formed with the oil pump housing 20. Also referring to FIG. 1, reference numeral 1 designates a torque converter assembly which includes a converter cover 2, a pump impeller 3, a turbine runner 4, and a stator 5. The pump impeller 3 is fixed to the outer periphery of the converter cover 2 by welding. The turbine runner 4 is secured to a turbine hub 6 at a flange portion thereof by riveting. The turbine hub 6 is splined to the end of the transmission input shaft 11. The stator 5 is provided between the pump impeller 3 and the turbine runner 4 to form a torque converter. The stator 5 is mounted in a hollow stationary sleeve 8 via a one way clutch 7. The stationary sleeve 8 permits the transmission input shaft 11 to extend therethrough while maintaining an annular space therearound.

The torque converter assembly 1 is accommodated in a torque converter housing 14 which is firmly secured to the transmission casing 15 by means of bolts 25. The oil pump cover 21 extends radially from the stationary sleeve 8. Within the pump housing 20, oil pump elements including an inner gear 17 and an outer gear 18 are operatively disposed. The oil pump cover 21 is secured to the pump housing 20 by means of bolts 23 in such a manner as to accommodate the oil pump body 16 in conjunction with the pump housing 20. A pump driving sleeve 9 extends into the pump housing 20 and is journalled through a bushing 10 fixed on the inner peripheral surface of the pump housing 20. The pump driving sleeve 9 permits the stationary sleeve 8 to extend therethrough. The pump driving sleeve 9 includes one axial end drivingly connected to the pump impeller 3 and the opposing end splined to the inner gear 17. Since the pump driving sleeve 9 is spaced from the stationary sleeve 8, an annular oil passage 12 is defined between the two sleeves 8 and 9. This passage 12 at its one end communicates with the inside of the pump impeller 3 and at its opposite end communicates with the outlet port of the oil pump body 16 through a pressure regulator valve (not shown) via an oil passage structure including a plurality of oil passages formed in the pump cover 21. Oil in the inside of the pump impeller 3 flows out of the turbine runner 4. The oil discharged from the turbine runner 4 flows to an annular oil passage 13 and thereafter the oil is fed from the passage 13 to the pressure maintaining valve (not shown) for maintaining the oil pressure within the torque converter assembly 1 at a certain determined level. Although not shown in FIG. 1, after flowing through the oil maintaining valve, the oil will flow to the oil cooler mounted within the radiator of the vehicle. After being cooled by the oil cooler, the oil will be distributed in the transmission to the various portions to be lubricated and thereafter flow back to the oil reservoir (not shown). In this manner, the torque converter performs its torque multiplying function because oil maintained at a certain pressure will transmit the required torque through the action of the stator 5 from the pump impeller 3 to the turbine runner 4.

The rotation of the crankshaft (not shown) of the internal combustion engine is always delivered to the pump impeller 3 through the converter cover 2. The rotation of the pump impeller 3 is delivered through the pump driving sleeve 9 to the inner gear 17 engaging with the outer gear 18. In this manner, the oil pump operates as long as the engine operates.

As clearly seen in FIG. 1, the pump cover 21 mates the transmission casing 15 at the outer perimeter thereof, in such a manner that the pump cover 21 is firmly secured to the transmission casing 15 at the mating surface 22 between the casing 15 and the cover 21 by means of bolts 24. As previously described, the operating oil is supplied from the outlet port of the oil pump body 16 to the valve assembly including an oil pressure regulator and a control valve through the oil passage structure formed in the pump cover 21. There have been proposed and developed various oil passage structures for communicating the oil pump with the valve assembly.

One such oil passage structure is shown in FIG. 2. Referring to FIG. 2, reference numeral 26 designates an opening formed on the mating surface 22 of the transmission casing 15. The opening 26 is connected through the oil passage defined in the oil pump cover 21 to the outlet port of the oil pump body 16. The opening 26 is communicated with the inlet port of the valve body 27 through a substantially T shaped communication passage which includes a horizontal channel 28 and a vertical channel 29. The horizontal channel 28 at one end communicates with the opening 26 and at an opposite end is closed by a plug (not shown) in an air tight fashion.

Another oil passage structure has been disclosed in Japanese Utility Model (Jikkai) Showa No. 60-7360. This oil passage structure includes a plurality of oil passages formed in a torque converter housing at the outer peripheral section of the converter housing which is sandwiched between the outer perimeter of the oil pump housing and the outer periphery of the transmission casing.

In these conventional oil passage structures, complicated machining of high accuracy is required and in addition auxiliary parts, such as plugs are required. Furthermore, due to the placement of the oil pump and valve assembly, the positioning options for the opening 26 and the two channels 28 and 29 are severely limited, resulting in a low degree of freedom of design with regard to the oil passages of the transmission casing 15.

SUMMARY OF THE INVENTION

It is therefore, in view of the above disadvantages, an object of the invention to provide an oil passage structure in a transmission casing for an automotive automatic transmission which allows a high degree of design freedom in determining the placement of the oil passages intercommunicating the oil pump body and the valve assembly.

It is another object of the invention to provide a simple oil passage structure in a transmission casing for which complicated machining is not required.

In order to accomplish the aforementioned and other objects, an oil passage structure in a transmission casing for an automotive automatic transmission, the transmission casing having an outer peripheral surface thereon abutting with the outer periphery of an oil pump cover being employed in an oil pump assembly including an intermediary oil passage means provided on the abutting surface of the transmission casing, for intercommunicating an oil channel defined in the transmission casing and communicated with a port of a control valve assembly of the transmission and an oil channel defined in the oil pump cover and communicated with a port of the oil pump assembly. The intermediary oil passage means includes an opening defined in the transmission casing so as to be exposed to the abutting surface of the transmission casing, the opening being communicated with the valve assembly of the automatic transmission through an oil channel defined in the transmission casing, and an intermediary oil groove defined on the abutting surface of the transmission casing. The intermediary oil groove includes a point connecting with the oil passage defined in the oil pump cover, to intercommunicate the opening and the connecting point, whereby the intermediary oil groove allows a high degree of freedom of design in determining the placement of the oil channel in the transmission casing.

According to another aspect of the invention, an oil passage structure in a transmission casing for an automotive automatic transmission, the transmission casing having an outer peripheral surface thereon abutting with the outer periphery of an oil pump cover being employed in an oil pump assembly comprises an opening defined in the transmission casing so as to be exposed to the abutting surface of the transmission casing, the opening being communicated with the inlet port of the valve assembly of the automatic transmission through a single straight oil channel formed in the transmission casing by machining, and an oil groove integrally formed on the abutting surface by die-casting. The oil groove includes a point connecting to the outlet port of the oil pump body of the oil pump assembly through the oil passage defined in the oil pump cover, to intercommunicate the opening and the connecting point.

According to a further aspect of the invention, an oil passage structure in a transmission casing for an automotive automatic transmission, the transmission casing having an outer peripheral surface thereon abutting with the outer periphery of an oil pump cover being employed in an oil pump assembly comprises an opening defined in the transmission casing in such a manner as to be exposed to the abutting surface of the transmission casing, the opening being communicated with the inlet port of the valve assembly of the automatic transmission through a single straight oil channel formed in the transmission casing by machining to provide the shortest distance between the inlet port of the valve assembly and the opening, and an oil groove integrally formed on the abutting surface by die-casting. The oil groove includes a point connecting to the outlet port of the oil pump body of the oil pump assembly through the oil passage defined in the oil pump cover, to intercommunicate the opening and the connecting point. At one end thereof the oil groove has the above described connecting point and at the opposing end is connected to the opening. The geometry of the oil groove and/or the number of the oil groove(s) is changed depending on the location and/or the number of oil passages or openings defined on the associated mating surface of the oil pump cover.

BEST MODE FOR CARRYING OUT THE INVENTION

Figure 1:
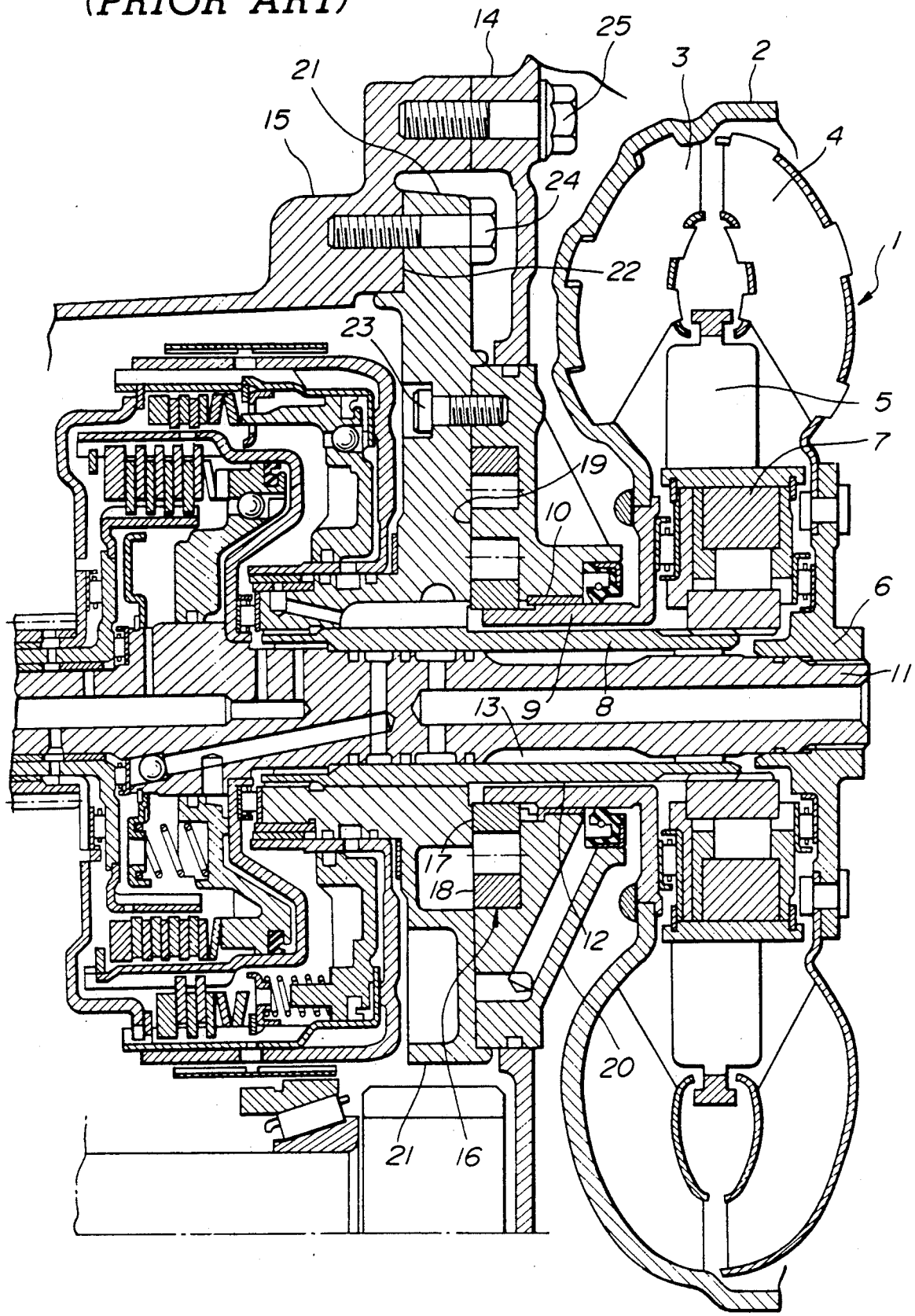
FIG. 1 is a partial sectional view illustrating a conventional automatic transmission.
Figure 2:
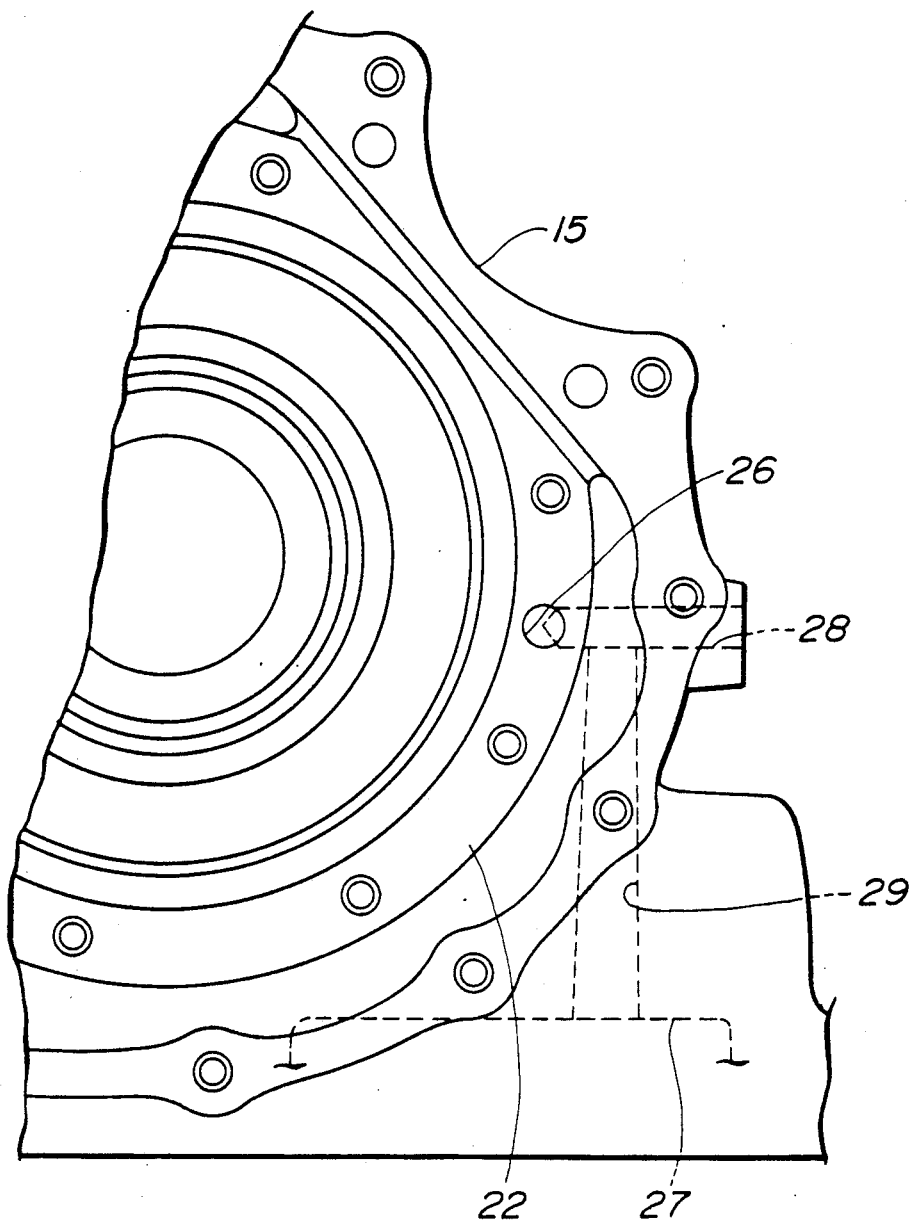
FIG. 2 is a partial sectional view illustrating the conventional oil passage structure of the transmission casing shown in FIG. 1.
Figure 3:
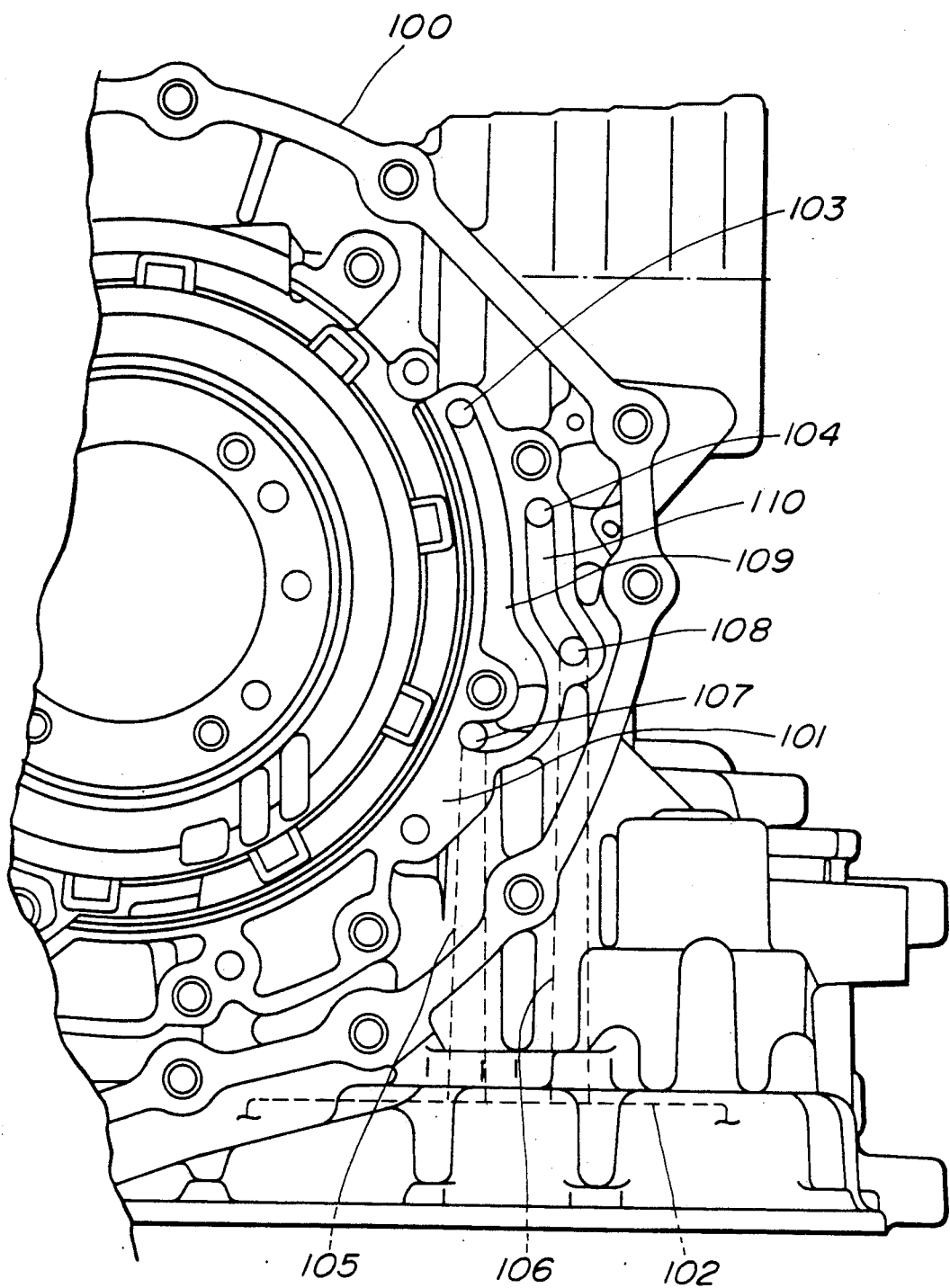
FIG. 3 is a partial sectional view illustrating the preferred embodiment of an improved oil passage structure for a transmission casing according to the invention.

Referring now to FIG. 3, reference numeral 100 is a transmission casing including an improved oil passage structure according to the invention. In this preferred embodiment, the oil passage structure according to the invention is comprised of two oil passages defined in the transmission casing 100. One oil passage includes an oil groove 109 which is formed on the mating surface 101 of the transmission casing 100 opposing the associated surface of the oil pump cover and has a connecting point 103 communicating through an oil passage defined in the oil pump cover to the outlet port of the oil pump body. The oil groove 109 also includes an opening 107 communicating through a vertical channel 105 with the inlet port of the valve assembly 102 which includes a pressure regulator valve and a control valve and is provided in close proximity to the bottom section of the transmission casing 100. In this way, the operating oil from the oil pump, via the outlet port on the oil pump body, is supplied through the oil passage in the oil pump cover, the connecting point 103, the oil groove 109, the opening 107 and the channel 105 to the inlet port of the valve assembly 102 in that order.

The other oil passage includes an oil groove 110 which is formed on the mating surface 101 and has a connecting point 104 communicating, via an oil passage defined in the oil pump cover, with the outlet port of the oil pump. This oil passage further includes an opening 108 communicating through a vertical channel 106 with the inlet port of the valve assembly 102. In this manner, the operating oil from the oil pump is supplied, via the outlet port in the oil pump body, through the oil passage in the oil pump cover, the connecting point 104, the oil groove 110, the opening 108 and the channel 106 to the inlet port of the valve assembly 102, in that order.

As clearly seen in FIG. 3, the geometry and/or the number of the above mentioned grooves may be suitably changed depending on the location and/or the number of the oil passages or openings defined on the associated mating surface of the oil pump cover. Since these oil grooves 109 and 110 are integrally formed on the mating surface 101 of the transmission casing 100 by die casting, the grooves 109 and 110 are formed with extremely high locational accuracy. Furthermore, since only the two straight channels 105 and 106 are formed in the transmission casing 100 by machining, complicated machining is avoided. In this construction, auxiliary parts, for example plugs, are not required.

As will be appreciated from the above, the oil passage structure according to the invention may provide a high degree of design freedom as to oil passages intercommunicating the oil pump body and the valve assembly.

While the foregoing is a description of the best mode for carrying out the invention, it will be understood that the invention is not limited to the particular embodiments shown and described herein, but may include variations and modifications without departing from the scope or spirit of this invention as described by the following claims.

What is claimed is:

1. An oil passage structure of a transmission casing for an automotive automatic transmission, said transmission casing having an outer peripheral surface thereon abutting with an outer periphery of an oil pump cover being employed in an oil pump assembly, said oil passage structure comprising:
   intermediary oil passage means provided on said abutting surface of said transmission casing, for intercommunicating an oil channel defined in said transmission casing and communicated with a port of a control valve assembly of said transmission and an oil channel defined in the oil pump cover and communicated with a port of the oil pump assembly, said intermediary oil passage means including:
   an opening defined in said transmission casing so as to be exposed to said abutting surface of said transmission casing, said opening being communicated with the port of the control valve assembly through the oil channel in said transmission casing; and
   an intermediary oil groove defined on said abutting surface of said transmission casing, said oil intermediary groove including a point connecting with the oil channel in said oil pump cover, to intercommunicate said opening and said connecting point, whereby said intermediary oil groove allows a high degree of freedom of design in determining the placement of the oil channel in the transmission casing.

2. The oil passage structure as set forth in claim 1, wherein said intermediary oil groove has said connecting point at one end thereof, and the other end thereof being connected to said opening.

3. The oil passage structure as set forth in claim 1, wherein both the geometry and the number of oil grooves defined on said abutting surface of said transmission casing are changed independently of each other depending on the location requirements, or the number of oil passages, or openings defined on the associated abutting surface of said oil pump cover, or both location requirements and the number of oil passages, or openings defined on the abutting surface of said oil pump cover.

4. The oil passage structure as set forth in claim 1, wherein the oil channel in said transmission casing is a single straight substantially vertical oil channel defined in said transmission casing by single-bore machining.

5. The oil passage structure as set forth in claim 1, wherein the intermediary oil grooves are integrally formed on said abutting surface of the transmission casing by die-casting, thereby being formed with extremely high locational accuracy.

* * * * *